United States Patent
Wood et al.

(10) Patent No.: US 11,874,827 B2
(45) Date of Patent: Jan. 16, 2024

(54) SYSTEM AND METHOD FOR AUTOMATIC, RAPID, AND AUDITABLE UPDATES OF DIGITAL CONTRACTS

(71) Applicant: Luther Systems US Incorporated, Los Gatos, CA (US)

(72) Inventors: Samuel Wood, Los Gatos, CA (US); Hossein Kakavand, Los Gatos, CA (US)

(73) Assignee: LUTHER SYSTEMS US INCORPORATED, Los Gatos, CA (US)

( * ) Notice: Subject to any disclaimer, the term of this patent is extended or adjusted under 35 U.S.C. 154(b) by 183 days.

(21) Appl. No.: 17/138,459

(22) Filed: Dec. 30, 2020

(65) Prior Publication Data

US 2022/0207022 A1 Jun. 30, 2022

(51) Int. Cl.
*G06F 9/44* (2018.01)
*G06F 16/23* (2019.01)
*G06F 8/65* (2018.01)
*G06Q 10/10* (2023.01)

(52) U.S. Cl.
CPC ........... *G06F 16/2379* (2019.01); *G06F 8/65* (2013.01); *G06Q 10/10* (2013.01)

(58) Field of Classification Search
CPC ........ G06F 16/2379; G06F 8/65; G06Q 10/10
USPC ....................................................... 717/168
See application file for complete search history.

(56) References Cited

U.S. PATENT DOCUMENTS

| | | |
|---|---|---|
| 5,680,611 A | 10/1997 | Rail et al. |
| 5,696,898 A | 12/1997 | Baker |
| 5,892,900 A | 4/1999 | Ginter et al. |
| 8,918,890 B2 | 12/2014 | Nakazawa |
| 10,075,298 B2 | 9/2018 | Struttman |
| 10,579,974 B1 | 3/2020 | Reed |
| 11,126,975 B2 | 9/2021 | Haldenby et al. |
| 11,223,877 B2 | 1/2022 | Madiesetti |
| 2003/0233357 A1 | 12/2003 | Merenda |
| 2007/0239589 A1 | 10/2007 | Wilson et al. |
| 2015/0221034 A1 | 8/2015 | Nyhoff et al. |
| 2015/0244690 A1 | 8/2015 | Mossbarger |
| 2015/0332283 A1 | 11/2015 | Witchey |
| 2015/0379510 A1 | 12/2015 | Smith |
| 2016/0028552 A1 | 1/2016 | Spanos |

(Continued)

FOREIGN PATENT DOCUMENTS

| | | |
|---|---|---|
| GB | 2571390 A | 8/2019 |
| WO | WO2015171580 A1 | 12/2015 |
| WO | WO2018201009 A1 | 11/2018 |

OTHER PUBLICATIONS

Ali, Robert et al., entitled, "Innovation in payment technologies and the emergence of digital currencies," Quarterly Bulletin, (2014) Q3, pp. 262-275.

(Continued)

*Primary Examiner* — Chuck O Kendall
(74) *Attorney, Agent, or Firm* — Manatt, Phelps & Phillips, LLP

(57) ABSTRACT

A system and method for automatic, rapid, and auditable updates of digital contracts allows participants to make agreed upon changes to a digital contract that is auditable and fast, so as to improve security, as well as reduce maintenance and operations costs of the management and execution of digital contracts.

24 Claims, 7 Drawing Sheets

(56) References Cited

U.S. PATENT DOCUMENTS

| | | | |
|---|---|---|---|
| 2016/0357550 | A1 | 12/2016 | Thomas et al. |
| 2017/0048217 | A1 | 2/2017 | Biggs et al. |
| 2017/0075938 | A1 | 3/2017 | Black et al. |
| 2017/0091750 | A1 | 3/2017 | Maim |
| 2017/0103385 | A1 | 4/2017 | Wilson, Jr. et al. |
| 2017/0103468 | A1 | 4/2017 | Orsini et al. |
| 2017/0193619 | A1 | 7/2017 | Rollins et al. |
| 2018/0323975 | A1 | 11/2018 | Curbera |
| 2018/0341648 | A1 | 11/2018 | Kakavand et al. |
| 2018/0341678 | A1 | 11/2018 | Moerkotte et al. |
| 2019/0286102 | A1 | 9/2019 | Carbone |
| 2019/0303892 | A1* | 10/2019 | Yantis .................. G06Q 10/10 |
| 2019/0327082 | A1 | 10/2019 | Ow |
| 2019/0361842 | A1 | 11/2019 | Wood et al. |
| 2020/0092088 | A1 | 3/2020 | Novotny |
| 2020/0111092 | A1 | 4/2020 | Wood et al. |
| 2020/0159697 | A1 | 5/2020 | Wood et al. |
| 2020/0201964 | A1 | 6/2020 | Nandakumar |
| 2021/0056070 | A1 | 2/2021 | Kakavand et al. |
| 2021/0174432 | A1* | 6/2021 | Gonnaud ............... G06Q 20/02 |

OTHER PUBLICATIONS

Vipula, Rawte et al., entitled, "Fraud Detection in Health Insurance Data Mining Techniques," 2015 International Conference on Communication, Information & Computing Technology (ICCICT), (Jan. 16-17, 2015), 6 pages.

Bahmani, Raad et al., entitled, "Secure Multiparty Computation from SGX," 38 pages.

BitFury Group, entitled, "Proof of Stake versus Proof of Work," White Paper, (Sep. 13, 2015), pp. 1-26.

Bloom, Burton H., entitled, "Space/Time Trade-offs in Hash Coding with Allowable Errors," Communications of the ACM, (Jul. 1970), vol. 13, No. 7, pp. 422-426.

Doerner, Jack, entitled, "An Introduction to Practical Multiparty Computation," 53 pages.

Fan, Li et al., entitled, "Summary Cache: A Scalable Wide-Area Web Cache Sharing Protocol," IEEE/ACM Transactions on Networking, (Jun. 2000), vol. 8, No. 3., pp. 281-293.

"IntelR Software Guard Extension (SGX) Remote Attestation End-To-End Sample," Github, (2018), 9 pages.

O'Keeffee, Dan et al., "Spectre-attack-sgx," GitHub, (2018), 2 pages.

Kakavand, Hossein et al., entitled, "The Blockchain Revolution: An Analysis of Regulation and Technology Related to Distributed Ledger Technologies," 27 pages.

Kwon, Jae, entitled, "Tendermint: Consensus without Mining," Draft v.0.6., pp. 1-11.

Lamport, Leslie et al., entitled, "The Byzantine Generals Problem," ACM Transactions on Programming Languages and Systems, (Jul. 1982), vol. 4, No. 3, pp. 382-401.

Manber, Udi, entitled, "Finding Similar Files in a Large File System," 1994 Winter USENIX Technical Conference, (Oct. 1993), 1-10 pages.

Nakamoto, Satoshi, entitled, "Bitcoin: A Peer-to-Peer Electronic Cash System," pp. 1-9.

Pilkington, Marc, entitled, "Blockchain Technology: Principles and Applications," Blockchain Technology: Principles and Applications, 39 pages.

Pinkas, Benny et al., entitled, "Phasing: Private Set Intersection using Permutation—based Hashing," UseniX Security, (2015) PSSZ15, pp. 1-21.

Rindal, Peter et al., entitled, "Improved Private Set Intersection against Malicious Adversaries," (Oct. 3, 2016), pp. 1-18.

"Summary of the HIPAA," Health Information Privacy, U.S. Department of Health and Human Services, (2013), 8 pages.

"The Intel Xeon Scalable—A Truly Big Day for the Data Center," (Jul. 11, 2017), 5 pages.

Clack et al. "Smart Contract Templates: essential requirements and design options." In: arXivreprint. Dec. 15, 2016 (Dec. 15, 2016), 15 pages. Retrieved from: https://arxiv.org/pdf/1612.04496.pdf.

Kakavand et al. ""The blockchain revolution: An analysis of regulation and technology related to distributed ledger technologies."" Oct. 12, 2016 (Oct. 12, 2016), 27 pages.

Kosba et al. "Hawk: The blockchain model of cryptography and privacy-preserving smart contracts." In: IEEE symposium on security and privacy. May 26, 2016 (May 26, 2016), 20 pages. Retrieved from: https://ieeexplore.ieee.org/stamp/stamp.jsp?tp=&arnumber=7546538.

Peters et al., ""Understanding modern banking ledgers through blockchain technologies: Future of transaction processing and smart contracts on the internet of money."" In: Banking Beyond Banks and Money. Nov. 18, 2015 (Nov. 18, 2015), 33 pages. Retrieved from: https://arxiv.org/pdf/1511.05740.pdf.

Hassan et al., ""Blockchain and the Future of the Internet: A Comprehensive Review,"" Information Technology University (ITU), Punjab, Pakistan, Feb. 23, 2019, 21 pages. Retrieved from: https://arxiv.org/pdf/1904.00733.pdf.

Reed, "Distributed Intelligent Agents System and Method for Securely Operating a Digital Virtual Currency", U.S. Appl. No. 62/116,853, filed Feb. 16, 2015.

Esposito et al., "Blockchain: A Panacea for Healthcare Cloud-Based Data Security and Privacy?", IEEE Cloud Computing, vol. 5, Jan./Feb. 2018, pp. 31-37 (8 pages).

Manber, Udi, entitled, "Finding Similar Files in a Large File System," TR 93-33—1994 Winter USENIX Technical Conference, Department of Computer Science, The University of Arizona, Tucson, Arizona, (Oct. 1993), 11 pages.

The Intel Xeon Scalable—a Truly Big Day for the Data Center, Intel's Newest Platform Designed for the Data Center is Its Highest Performance, Most Versatile Ever, Jul. 11, 2017, 5 pages.

Okoye, Mildred, "New Applications of Blockchain Technology to Voting and Lending", Nov. 2017, 146 pages.

Association of International Certified Professional Accountants, Blockchain Universal Glossery, Year: 2020, 3 pages.

Bitcoind—Bitcoin Wiki, Year 2019, 10 pages.

Running a Full Node, Bitcoin, Year 2022, 85 pages.

Running Bitcoin, Bitcoin Wiki, Year 2019, 5 pages.

Selimi, et al., "Towards Blockchain-enabled Wireless Mesh Networks", CryBlock '18, Jun. 15, 2018, Munich, Germany, 6 pages.

Yaga, et al., "Blockchain Technology Overview", NIST.IR. 8202, Oct. 2018, https://doi.org/10.6028/NIST.IR.8202, 68 pgs.

Keritsis, U.S. Appl. No. 16/383,720, Notice of Allowance and Fees Due (PTOL-85), Oct. 25, 2021, 9 pgs.

* cited by examiner

```
(in-package 'user)
(use-package 'router)

(defendpoint init ()
  (route-success ()))

(defendpoint healthcheck ()
  (cc:warnf () "The healthcheck endpoint has not been configured")
  (route-failure ()))
```

FIG 7.

SYSTEM AND METHOD FOR AUTOMATIC, RAPID, AND AUDITABLE UPDATES OF DIGITAL CONTRACTS

FIELD

The disclosure relates to a system and method for updating, processing, storage, programming languages, and management of digital contracts.

BACKGROUND

The term "Over-the-air (OTA) update" typically refers to the ability for a mobile phone carrier to distribute and install a new version of software onto a mobile phone automatically. This approach dramatically reduces the difficulty and burden for phone owners who previously needed to physically go to a specific store to perform the update, or manually download and install the software. These previous approaches were slow and error prone, which resulted in mobile phones often running out-dated software. Ultimately this is a poor user experience, where users miss out on important updates that improve performance, security, and provide new features. A network of outdated phones also increases the maintenance and operations costs for the mobile provider who must support these outdated versions. Importantly, modern programming, security, and software development practices all require the ability to rapidly roll out new versions of software.

For these same reasons, companies including Apple and Tesla have adopted the OTA pattern to distribute software updates. In the case of Tesla, their fleet of vehicles use an active Internet connection to automatically download newer versions of the software. The power of OTA was demonstrated in 2015 at the security conference DEFCON when researchers demonstrated a vulnerability with the Tesla cars which allowed the attackers to remotely control the vehicle. By the time the vulnerability was made public at the conference Tesla had already pushed an update to patch the vulnerability across its entire fleet of vehicles, thus stopping potentially lethal attacks. At the time no other commercial automobile manufacturer had this capability, however this approach has quickly become the gold standard. Along these lines, the need for OTA is paramount for security as software is increasingly connected to the physical world through the rise of Internet of Things ("IoT").

Despite the advantages of OTA, most Enterprise software lacks an ability to quickly and automatically retrieve new versions of software. In many cases this is due to how tightly coupled or integrated Enterprise software is to other software within the Enterprise. These various software and integrations are often proprietary, legacy, or operated and maintained by separate teams or vendors. Oftentimes the connections are bespoke and brittle, resulting in a complex matrix of inter-dependent software. Because of this complexity, any software change is risky, and may result in unexpected outages or downtime, possibly in other downstream systems not directly being updated at all. As a result of this risk, software often remains outdated and changes are considerably expensive and slow. This friction poses a significant impediment to digital transformation initiatives that aim to jumpstart Enterprises by adopting modern software technology and development practices.

This difficult problem of updating interconnected software is known throughout the industry, and is sometimes known as the "Protocol Ossification" problem in a computer networking setting. The best example of protocol ossification is the Internet itself, specifically the notoriously slow upgrade of the Internet Protocol (IP) v4 to IPv6. IPv6 is a newer version of the protocol with considerable advantages over the common IPv4, and although in 2020 it has been available for over 25 years, it has yet to exceed more than 33% adoption of Internet users (See en.wikipedia.org/wiki/IPv6 deployment#:~:text=Google's%20statistics%20show%20IPv6%20availability,countries%20and%20Internet%20service%20providers that is incorporated herein by reference).

When architecting and designing new Enterprise software it is paramount to ensure that it is extensible, or can readily be updated so as to prevent ossification. New Enterprise software should provide an OTA mechanism out-of-the-box to deliver on digital transformation initiatives. This mandate is even more necessary for inter-connected software that spans teams, groups, and vendors. Modern software development practices are increasingly being adopted by various institutions, and these practices require an ability to quickly release and deploy software updates, as part of the Continuous Delivery (CD) paradigm. Furthermore, distributed ledger and permissioned blockchain technology is increasingly being adopted throughout the Enterprise as part of digital transformation initiatives. Within this architecture, Smart Contracts play the crucial role of encapsulating business logic that is jointly executed and verified by a network of participants.

The Blockchain Architecture and Smart Contracts in a blockchain architecture are both well known. Furthermore, there is a current known technique by which Smart Contracts are updated.

Blockchain & Distributed Ledger Technology (DLT) Overview

In general, a blockchain is a digital platform that stores and verifies the entire history of transactions between users across a network in a tamper- and revision-proof way. It is also the underlying database structure for digital currency transactions, such as those included in the Bitcoin and Ethereum networks. The paper "Bitcoin: A peer-to-peer electronic cash system" (Nakamoto, 2009) is incorporated into this application by reference. Transactions between users or counter-parties are broadcast across the network, verified by cryptographic algorithms, and grouped into blocks. Each new block is subsequently verified by nodes in the network. As part of the verification process, nodes verify that the candidate block contains a cryptographically secure reference to the previous block. This reference is used to detect and prevent alterations to the order and history of transactions. Through these references, nodes create, verify, and store chains of blocks, or maintain a "blockchain". For example, each node participating in the Bitcoin network has its own copy of the blockchain, which is synchronized with other nodes using a peer-to-peer protocol ("Proof of Stake versus Proof of Work", White Paper, Bitfury Group Limited, Sep. 13, 2015). This approach "removes the need for a central authority and thus for participants to have confidence in the integrity of any single entity." ("Innovations in payment technologies and the emergence of digital currencies", Robleh Ali, 2014). Blockchain technologies enable multiple organizations and groups within an organization to efficiently process transactions and securely reach consensus without the requirement of a third party ("The Blockchain Revolution: An Analysis of Regulation and Technology Related to Distributed Ledger Technologies", H. Kakavand, N. Kost De Sevres, Commissioner B. Chilton).

Fundamentally, blockchain and distributed ledger technologies (DLT), consist of a network of nodes that execute protocols to maintain a consistent ledger(s), where nodes are possibly owned and operated by organizations that do not trust one another. Unlike traditional distributed databases, with these technologies there is not a requirement for a central authority that manages a database, but instead participants manage their own databases by running software that executes consensus protocols to reconcile their ledgers. Recently, the industry has adopted a taxonomy where the general term "Distributed Ledger Technology (DLT)" describes systems that adopt this general architecture (described in more detail in "Thoughts on the taxonomy of blockchains & distributed ledger technologies", Colin Platt, Medium, Feb. 27, 2017 (available at //medium.com/@colin_/thoughts-on-the-taxonomy-of-blockchains-distributed-ledger-technologies-ecad1c819e28 that is incorporated herein by reference), and the term "blockchain" is used to describe a narrow, or specific type of DLT. This taxonomy is not universally agreed upon and some use the term "blockchain" to either 1) only refer to cryptocurrency networks such as Bitcoin, 2) only refer to systems where every node has access to every (possibly encrypted or confidential) transactions and block, or 3) only refer to systems that maintain a distributed merkle tree.

In particular, R3, a blockchain and DLT development company, describes its Bitcoin-inspired Corda system as a DLT but not a blockchain. R3 argues for this nomenclature because the Corda network does not maintain a global shared ledger of transactions, nor does Corda use the standard data structures found in other Blockchain-based systems (described in more detail in "Corda: A Distributed Ledger", Mike Hearn, R3, 2016 available at //docs.corda.net/_static/corda-technical-whitepaper.pdf that is incorporated herein by reference). Specifically, Corda does not group transactions into blocks which are replicated and ordered by the network to ensure transaction validity, nor does it use standard cryptographic data structures ("Merkle trees" that form a "chain" of hashes) to achieve transaction immutability. Instead, each Corda peer maintains their own database of transactions known as a vault. In order to prevent double spends and verify transactions, each transaction specifies a notary (specifically, a transaction initiator specifies a notary policy which can include a set of notaries who must sign the transaction in order for it to be valid. This policy may only expose some of the transaction details to the notary in order for them to sign, providing partial transaction confidentiality) that executes the transaction on behalf of the counterparties to ensure that it is valid and has only been executed once (e.g., it is not a double spend). Any node on the network can perform these notary services, however a particular asset must always use the same notary to correctly validate a transaction.

In this document, the nomenclature used to describe blockchain-based systems is used, however many of the same concepts and descriptions are common to DLT systems such as R3's Corda. In most cases, the term "blockchain" and DLT can be used interchangeably throughout this document. For a review of blockchain technology concepts and terminology, please see the NIST Report ("NISTIR 8202: Blockchain Technology Overview", D. Yaga, et. al, October 2018" available from //doi.org/10.6028/NIST.IR.8202) which is incorporated into this application by reference.

Blockchain Architecture: Systems that adopt a blockchain architecture typically include components from the following three categories: Blockchain Maintenance (e.g., nodes), Blockchain Interfaces (e.g., clients and oracles), Blockchain "on-chain" Code (e.g., smart contracts or scripts).

Smart contracts are computer protocols that facilitate, verify, or enforce the negotiation or performance of a contract, or that make a contractual clause unnecessary. Smart contracts often emulate the logic of contractual clauses. To develop a smart contract, parts of the terms that make up a traditional contract are implemented in software code and uploaded and executed by nodes that maintain a blockchain network, producing a decentralized smart contract that does not rely on a single trusted third-party for recordkeeping or enforcement. Applications that use Smart Contracts executed on a decentralized network are referred to as decentralized applications, or "DApps". Contractual clauses are automatically executed when pre-programed conditions are satisfied. This eliminates ambiguity regarding the terms of the agreement and disagreement concerning the existence of external dependencies ("The Blockchain Revolution: An Analysis of Regulation and Technology Related to Distributed Ledger Technologies", H. Kakavand, N. Kost De Sevres, Commissioner B. Chilton.)

Transactions: Users submit transactions to nodes using a client. In Bitcoin-based technologies, a transaction is a signed message that includes a script which is executed by nodes to transfer value from one or more addresses to one or more other addresses. In other blockchain technologies including Ethereum and Hyperledger Fabric, a transaction is a signed message used to either deploy a smart contract or send a message to a smart contract which uses the message payload to execute a function and update the nodes' state. Transactions are grouped together by certain nodes into blocks which are also disseminated through the network, validated, and added to each node's blockchain data structure. Specifically, each transaction is validated and processed by each node, where the side effect of transaction processing is the update of a node's local database known as the state database. Each node maintains a copy of their own copy of the state database. In Bitcoin, this database maintains a list of unspent transaction outputs (UTXO) which is used to detect double spending of the Bitcoin currency, and in Ethereum this database also includes values for variables managed by smart contracts. A transaction is said to be confirmed if it is included in a block which has been added to the blockchain, and the corresponding transactions have been executed.

Blockchain Oracles are off-chain services selected by counterparties that are responsible for sending data and commands to on-chain smart contracts. Oracles are a type of application that has access to the blockchain network and that typically creates transactions to update smart contracts with new data. Where a smart contract's conditions depend upon real world data (e.g., the price of a commodity future at a given time), these agreed-upon outside applications called "oracles" can be developed to monitor and verify prices, performance, or other real world events. For example, the price of an asset at a given time, or the credit default of an entity.

Blockchain Clients are authenticated applications that provide an interface to the blockchain for users and other applications. In practice, users/counterparties interact with Blockchain clients. The clients deploy smart contracts, create transactions, and query the status of smart contracts running on the blockchain. We refer to the "counterparty client" as the "counterparty". Clients create and update Smart Contracts by submitting transactions to a node on the network. This node subsequently disseminates the transaction to other nodes on the network for verification. The transaction contains a payload, or data, that is stored on the blockchain and passed as input to a contract for subsequent execution.

On-chain Code, or chaincode is certain software code that is executed by nodes on the blockchain network. Many recent blockchain architectures provide a mechanism for nodes to execute smart contracts. Smart contracts are written in chaincode which is a programming language that is supported by the blockchain network. For example, Hyperledger Fabric supports the execution of chaincode written in Go. Chaincode is deployed to the blockchain network by a blockchain client. In many systems, this means that the client creates a deploy transaction that includes the chaincode, or a reference to the chaincode, as its payload. This deploy transaction is stored on the blockchain and subsequently downloaded by nodes for execution. A unique ID is generated for each deployed smart contract which is used by clients to create transactions. Specifically, clients create transactions with payloads, or data, that are sent to the smart contract using this ID, and smart contracts process the data to update their state. This code is written in a smart contract language such as Solidity in Ethereum or Go in Hyperledger Fabric. In Bitcoin, the smart contract language is a domain specific language (DSL) named Bitcoin Script and is limited to only allowing simple payment instructions. Each node runs the chaincode to validate transactions and maintain the integrity of the blockchain. A smart contract reads and writes data that is stored on the blockchain during its execution. This reading and writing of blockchain data by the smart contract is known as on-chain execution. These data are the values of all of the variables within the chaincode and are known as the contract's state. All inputs to the smart contract and outputs must exist in transactions within the blockchain data structure. This requirement, along with the contract's chaincode, allows every node in the network to consistently execute each step of the contract and deterministically compute the same state database.

Different blockchain architectures use different models for managing transaction state, namely 1) stateless or the "unspent transaction output" (UTXO) model, and 2) stateful or the Account Balance model. In many cases one can use a stateful transaction model to emulate a stateless application (described in more detail in Androulaki, Elli, et al. "Hyperledger fabric: a distributed operating system for permissioned blockchains." *Proceedings of the Thirteenth EuroSys Conference*. ACM, 2018 that is incorporated herein by reference), and conversely one can implement stateful "off-chain" smart contracts as a stateful layer on top of a stateless transaction model (described in more detail by Sergio Demian Lerner. "RSK White paper overview" available at the blockchain.com/docs/Rootstock-WhitePaper-Overview.pdf.2015 that is incorporated herein by reference).

Bitcoin and Bitcoin-inspired systems such as Corda adopt the stateless transaction model where all transactions are interlinked through a concept of transaction inputs and outputs, where each transaction defines its inputs and outputs. Transaction outputs specify conditions that an input must satisfy in order for the transaction to be valid. A transaction input 1) references a previous transaction output, and 2) provides the necessary data as input to satisfy the referenced output. To prevent double spending, UTXO based systems maintain a database of all transaction outputs which have not yet been used as an input (known as unspent transaction outputs). As part of transaction validation, nodes verify that the defined input data meets the necessary constraints specified in the previously unspent output. In practice, these constraints are defined in a limited Domain Specific Language (DSL), for example Bitcoin Script, that provides payments functionality.

To support general smart contracts and non-financial use cases, systems such as Ethereum and Hyperledger Fabric have adopted an Account Balance or "stateful" transaction model. In these systems, transactions do not specify inputs and outputs. Instead, participants deploy a smart contract to the network which codifies all of the business rules that determine the validity of transactions related to the smart contract. Instead of nodes maintaining a database of UTXOs, nodes maintain a database that stores the data managed by a smart contract (e.g., variables that the smart contract program can read and write to). This approach allows the smart contract to contain the logic to process transactions and update its state. The network assigns the deployed smart contract a unique address. Participants subsequently send messages to, and query, this smart contract by constructing transactions that include the message as a payload. The smart contract itself is written in a high level programming language (e.g., Solidity for Ethereum, and Golang for Hyperledger Fabric) that can perform arbitrary calculations (Turing Complete) so long as the program is deterministic. Note that unlike in the stateless model this business logic is not contained within each transaction, which would otherwise have prohibitively expensive storage costs. Furthermore, this approach does not require the business logic to be in the strict form of a domain specific language or logical formula composed of predicates. Programmers can use standard and familiar programming constructs such as for-loops and object oriented programming to define business logic. Oracles proactively provide external data directly via transactions that are sent to the smart contract address, as opposed to the stateless model where oracles reactively sign a transaction or predicate.

Off-chain Code: Code that is executed entirely off the blockchain network. In other words, code that is not "on-chain code".

Query: Clients can send query messages to a node to lookup the information stored on the blockchain. For example, a client can issue a query to retrieve the latest state associated with a smart contract. The node does not necessarily need to communicate with other nodes to answer this query, in some cases it can use its own locally maintained blockchain that is synchronized with the network to retrieve the requested state.

Node: A blockchain is maintained by software that runs on a computer called a node or peer. Each node is connected to other nodes to form the blockchain network and can submit and receive transactions. Each node participating in the Bitcoin network, for example, has its own copy of the blockchain, which is synchronized with other nodes using a peer-to-peer protocol. Organizations and possibly individuals maintain nodes. These nodes run Blockchain software to communicate with each other and form a Blockchain network. In a permissioned blockchain, only authorized and authenticated nodes are able to connect to one another to form the blockchain network. In a permissionless blockchain there is no authentication process and in most cases the identities of the participants are anonymized or not publicly known.

Network: Organizations and possibly individuals maintain computer systems called nodes, these nodes run blockchain software to communicate with each other and form a blockchain network. The network can either be 1) permissioned or 2) permissionless depending on whether nodes and clients go through an authentication and authorization process.

Submit Transaction: Users submit transactions to the blockchain network by using a client that sends them to nodes on the network who subsequently disseminate them to other nodes on the network.

Transaction Validation: Nodes on the blockchain network receive, process and cryptographically validate each transaction. The network ignores invalid transactions.

Blocks: Nodes collect and group valid transactions together into a bundle known as a block. Nodes follow a predetermined set of rules to determine whether a block is valid. For example, a block must not exceed a maximum size in bytes, contain more than a maximum number of transactions, and must reference the most recent valid block. Nodes use the chain of blocks to establish a total ordering for all transactions. Nodes execute a consensus protocol to agree on a new block, and nodes validate and process the transactions within the new block. Nodes ignore invalid blocks.

In distributed systems, multiple processes communicate to enable system operation. It is possible for faults to occur anywhere throughout a distributed system, for example processes may crash or adversaries may send malicious messages to processes. Distributed systems use consensus protocols to achieve reliability in environments with faults. Processes execute a consensus protocol so that they reach agreement within a certain period of time. For example, in Bitcoin, nodes execute a proof-of-work (PoW) consensus protocol to reach agreement on the next valid block and blocks are generated roughly every 10 minutes. PoW is particularly well-suited for permissionless blockchains where the identities and number of participants are not known. An adversary who injects malicious data into the system can trigger faults known as "Byzantine faults" where multiple processes receive conflicting information. Byzantine Fault Tolerance (BFT) refers to consensus protocols that achieve consensus in environments with Byzantine faults. BFT is a well understood distributed systems problem within computer science and implementations have existed for several decades (Lamport, Leslie, Robert Shostak, and Marshall Pease. "The Byzantine generals problem." ACM Transactions on Programming Languages and Systems, 1982). Traditional BFT consensus protocols are well-suited for permissioned blockchains where the identities and number of participants are known.

Validator nodes 1) store the blockchain data structure (blocks and transactions), 2) maintain the integrity of the blockchain by validating transactions and blocks, and 3) maintain the state database by committing the valid transaction updates contained within in a new block. Blocks contain data including a set of transactions, a reference to the previous block, and possibly a "state hash" which is a hash over a snapshot of the current state database. In other words, the state hash captures the result of each smart contract executing its relevant transactions. Peers disseminate blocks to one another and use a consensus protocol (e.g., PBFT, or Nakamoto consensus (Bitcoin: A Peer-to-Peer Electronic Cash System, Satoshi Nakamoto 2008)) to reach agreement as to which block to add to the top of the blockchain. Only valid blocks are accepted and added to the blockchain data structure after the network has reached consensus on the most recent block.

Generally, state is the current data, or values of the variables, read from and written to by a smart contract. Smart contracts use variables stored in the state database to validate transactions. In the case of bitcoin, state is the current set of unspent transaction outputs (UTXOs). Validator nodes maintain the blockchain data structure which contains blocks, transactions, and transaction payloads. In the stateful transaction model when a smart contract is deployed it is assigned a unique ID and every validator begins executing the smart contract code locally. When a node receives a new block it takes the transactions and uses the ID to pass them to the relevant smart contract for execution. The result of this execution is that the smart contract updates its local variables, or state. A state hash is a hash over all of the variables across all of the running smart contracts. Each block includes a state hash which is the result of hashing the entire "world" state after executing all of the transactions within that block. Although the state hash is included directly within the blockchain data structure, the contract state itself is not stored in the blockchain data structure per se—it is a function of smart contracts executing transactions in an agreed-upon order and updating their local state database replicas.

A node's blocks, transactions, and smart contract state are available at any time to a blockchain client. The client sends a query message with a specified contract ID to a node who then relays this request to the running smart contract. The node then relays the response to the client. In the case of a permissioned network, only authenticated and authorized clients can issue query messages. In a permissionless network there is no authentication process.

Order Execute (OE) vs Execute Order Validate (EOV) Architectures. Blockchain architectures generally fall into one of two categories, based on how they process transactions and update their state databases. Most blockchain systems, including Bitcoin and Ethereum, use an order execute (OE) model. In these systems, nodes reach consensus on the latest block of transactions, which includes the reference to the previous block, and establishes a total ordering of the transactions. Once consensus on the next block is achieved, each node executes the transactions within the block and updates the state database.

In contrast, the Hyperledger Fabric 1.0 and 2.0 architectures adopt a Execute-Order-Validate (EOV) architecture. With this approach, nodes first simulate the execution of a transaction, and then construct a transaction endorsement which includes a digital signature by the executing node (the endorser), along with a record of the data that was accessed and written to by the smart contract (read-write set). The transaction endorsement is then submitted to the network to be ordered and placed in a block. Once the nodes reach consensus on the latest block, the corresponding transactions are evaluated according to smart contract-specific endorsement policies, along with consistency checks to ensure the transactions are valid and are not in conflict (e.g., using Multi-Version Concurrency Control, MVCC, on the transaction read-write sets). For each valid transaction, the node commits the transaction update to the state database and does not re-execute the smart contract.

For a detailed description of the differences between OE versus EOV architectures please see the paper (Androulaki, Elli, et al. "Hyperledger Fabric: a distributed operating system for permissioned blockchains." *Proceedings of the Thirteenth EuroSys Conference* ACM, 2018) which is incorporated into this application by reference.

Blockchain technology strengthens trust-based contracts by adding rules that are defined and enforced programmatically (Pilkington, Marc, "Blockchain Technology: Principles and Applications," page 15 (citing Kwon, J. (2014). Tendermint: Consensus without Mining. White paper.). Three key technical benefits provided by most blockchain systems are the following:

1) Decentralization: Peer-to-peer blockchain protocols enable counterparties to engage in business processes without requiring trust in each other or a trusted third party. In some applications the function of a trusted intermediary can be replaced by a blockchain network. Disintermediation through decentralization can reduce costs, increase transparency, and improve operating efficiency (e.g., through reduced settlement times).

2) Immutable Transaction Log: Blockchain protocols use modern cryptography to maintain a distributed ledger that records every transaction in a tamper-proof way. Every node within the network stores the entire ledger with timestamps. This facilitates transaction finality, detection of contract execution errors (e.g., double spending), provides resilience when nodes fail, and prevents malicious tampering.

3) Standardized Contract Execution Platform: Blockchain systems offers a shared infrastructure for smart contract execution for an enterprise consortium. Standardization of smart contract templates and their execution platforms can reduce operating costs by easing cross-organizational interoperability for multiple asset classes. In some cases compliance logic can be added to the smart contract which further reduces auditing costs.

Hash Function: A hash function is a one-way function that maps an input of arbitrary size to a fixed size output called a hash. A cryptographic hash function is a hash function that includes the properties (i) easy to generate the hash given the input, (ii) infeasible to generate the original input given the hash, (iii) practically impossible for two similar inputs to have the same output in a so called "collision". SHA256 is an example cryptographic hash function that is used in the Bitcoin and Ethereum Blockchain networks.

Merkle Tree: A merkle tree is a tree data structure in which every non-leaf node is labelled with the hash of the labels or values (in case of leaves) of its child nodes.

In practice nodes do not directly reach consensus on the contract's state, but instead reach consensus on blocks which include a summary of the state known as the state hash. The state hash itself may be contained within a merkle tree which is a summary of the execution of multiple smart contracts. A state hash is a hash over all of the current values of the variables contained within a smart contract. It represents a "snapshot" of the blockchain's state at a specific point in time. If two nodes compute the same state hash then they know they are in agreement on the contract's execution and have identical state databases.

An important motivation for executing a smart contract on a blockchain is to ensure that all of the counterparties agree on the history and current state of the contract in a non-reputable way. Nonrepudiation means that the counterparties make a commitment towards their agreement that is permanent and undeniable. In the event that the counterparties disagree on the state of the agreement, they can undeniably identify the same exact moment where their smart contract execution diverged, greatly simplifying resolution or arbitration.

A person of ordinary skill in the art in the field of this system and method is familiar with permissioned blockchain architectures and distributed ledger technology inspired by blockchain technology, such as Hyperledger fabric (hyperledger.org), Bigchain DB (bigchaindb.com), and R3 Corda (r3.com/corda-platform).

A person of ordinary skill in the art in the field of this system and method is familiar with permissionless blockchain platforms such as Bitcoin (bitcoin.org) and Ethereum (ethereum.org).

Smart Contract Update Mechanisms: The specific mechanisms for updating Smart Contracts are particular to different blockchain and DLT platforms.

Ethereum: Ethereum is the most popular public platform for executing Smart Contracts as of 2020. It is representative of the state-of-the-art for public or permissionless blockchains that execute Smart Contracts. Permissionless blockchains do not require the identities of the participants to be known to the network. They are designed to allow anyone to access and participate in the network, and they have censorship resistant properties to prevent an individual's transactions from being identified and blocked by the network. Permissionless blockchains are designed to have global network sizes in scale, at the expense of lower transaction throughput than permissioned blockchains.

Ethereum Smart Contract Updates: Ethereum Smart Contracts are immutable, meaning that by design their code cannot change once deployed on the Ethereum network. Without an upgrade mechanism, this means making changes to the Ethereum Smart Contract code requires a five step process: 1) Deploy the new version, 2) Export all of the data out of the old Smart Contract, 3) Import the old data into the new Smart Contract, 4) Update all of the other Smart Contracts that reference the old Smart Contract address to use the new Smart Contract address, and 5) Update all of the users and applications that reference the old Smart Contract Address to use the new Smart Contract Address. In practice, steps 2 and 3 are very difficult, requiring the developer to write specialized and error prone code that migrates data between the two Smart Contracts over a period of time. Steps 4 and 5 are often prohibitive, since the referencing Smart Contracts themselves are immutable, and often belong to separate groups or organizations. In practice this method is not a viable approach to upgrading Smart Contracts.

Ethereum does provide an indirect means to update code that is executed by a Smart Contract using a pattern called "Proxy Upgrade." With this approach, a "proxy" Smart Contract maintains a pointer to an "implementation" Smart Contract. End users or other Smart Contracts that wish to interact with the "implementation" Smart Contract only do so via this proxy, using the proxy's unchanging contract address. All transactions sent to the "proxy" Smart Contract are forwarded to the "implementation" smart contract. Specifically, this forwarding is done by the Proxy Smart Contract by using a special "delegate call" Ethereum command which loads the code in the referenced Implementation Smart Contract and executes this code using the state namespace of the Proxy Smart Contract. The Proxy Smart Contract provides an administrator interface where an administrator known as the "owner" sets the referenced Implementation Smart Contract address. To change the implementation to a new version, the owner deploys a new Implementation Smart Contract and issues the command to the Proxy Smart Contract that updates the reference to the contract address of the new Implementation Smart Contract.

The "Proxy Upgrade" pattern overcomes the limitations discussed above. Namely, it does not require users or other Smart Contracts to update the contract address to the new implementation and it does not require a data migration from the old Smart Contract to the new one. However, this pattern does introduce other limitations. Namely, it requires careful data management and variable placement between the implementation Smart Contracts. No backwards incompatible changes to the data layout are possible across implementations, and there is no data migration capability supported for backwards incompatible versions of the Smart Contract. In practice, new variables are only added across updates (implementation Smart Contracts), which leads to larger and more costly Smart Contracts. Furthermore, there is no "rollback" capability to revert a change that changes the data layout. Only a single version of the Smart Contract is executable at any given time, which makes it difficult for applications/users of the Smart Contract to update in a zero downtime way.

Hyperledger Fabric Chaincode Updates: Hyperledger Fabric is representative of the state-of-the-art for private or permissioned blockchains that execute Smart Contracts. Permissioned blockchains require the identities of the network participants to be authenticated for network access. Only certain participants are authorized access to the network, and each participant has restricted roles. Permissioned blockchains typically do not have the same censorship resistant properties as permissionless blockchains, and consequently use different consensus algorithms, and are designed for smaller networks with larger transaction throughput.

Hyperledger Fabric (HLF) Chaincode Updates: In HLF, Chaincode (Smart Contracts) are installed on a channel (blockchain or ledger). HLF 2.0 supports Smart Contract updates through its "Chaincode Lifecycle Management" process. To upgrade a chaincode in HLF, there are 4 high-level steps: Step 1. Package smart contract code; Step 2. Install package on peer; Step 3. Approve chaincode definition for each org; and Step 4. Commit chaincode definition to channel.

Step 1) Package Smart Contract Code: one or more organisations must package the chaincode source code in a format that is compatible with the HLF network. This package must subsequently be distributed to the peers of the other participating organisations. This distribution happens outside of the blockchain network and its protocols.

Step 2) Install Package on Peers: Each peer participating in the execution of the chaincode must then install the chaincode package using an install script. A network operator for an organisation typically performs this installation step manually, or manually triggers the automated execution of the install script.

Step 3) Approve Chaincode Definition for Each Org: Each organisation creates a special transaction using the administration tools provided by Fabric. This transaction designates to the network that the organisation approves of the installation of the chaincode update. This approval is recorded on the channel. The approval itself includes a "Chaincode Definition" which specifies the name, version, and access control policies for the chaincode. These policies include the agreement and consensus rules that govern future updates of the Chaincode. This specification does not include a description, signature, or hash of the chaincode software itself.

Step 4) Commit Chaincode Definition To Channel: Once all the necessary organisations have approved the Chaincode Definition, one organisation must create a special transaction to commit the chaincode update. They create this transaction using the administration tools provided by Fabric. This commitment is received by all of the organisations on the channel, and triggers the execution of the installed Chaincode package on each of the participating peers. This commitment fails validation if the commitment does not have all of the necessary approvals, where the approvals were collected at Step 3.

This four step process provides a way for a network administrator to update chaincode, with the help of the participating organisations. However, this process has several limitations: There is no guarantee that the same chaincode source is executed by all participants. The network only requires that they reach agreement on the chaincode definition as part of the regular consensus process. This makes troubleshooting & debugging difficult when participants fail to reach consensus.

The chaincode source is not provided to the participants by the Hyperledger Fabric network. This reduces the auditability of the system since the participants cannot look up what exact source code was used to process a transaction.

Step 1 requires a separate distribution mechanism of the chaincode package. This distribution mechanism happens outside of HLF. In practice, this is typically a manual process and requires additional development of a system to distribute these packages across the network. This additional system is non-standard and increases overall solution cost and development time.

Step 3 requires a manual step executed by each participating organization's administrator. Collecting approvals from all of the organizations is often slow and error prone, which generally increases the friction in deploying updates.

Step 4 results in temporary downtime, as the old chaincode is destroyed and the new one is initialized and executed. This reduces overall system uptime and availability.

This process does not provide a way to rollback an update. This is a critical feature in Enterprise environments with strict Software Development Lifecycle Management (SDLC) policies, in order to quickly revert a change which has introduced new failures.

Despite the increasingly important role Smart Contracts play across many industries, to date they are difficult to update. Furthermore, the existing known update methods have limitations described above that pose a technical problem. That technical problem can be solved by a technical solution of an over the air smart contract update and it is to this end that the disclosure is directed.

BRIEF DESCRIPTION OF THE DRAWINGS

For a more complete understanding of the invention, reference is made to the following description and accompanying drawings, in which:

FIG. 7. illustrates an example business logic that is deployed by an OTA update.

DETAILED DESCRIPTION OF ONE OR MORE EMBODIMENTS

Figure 1:
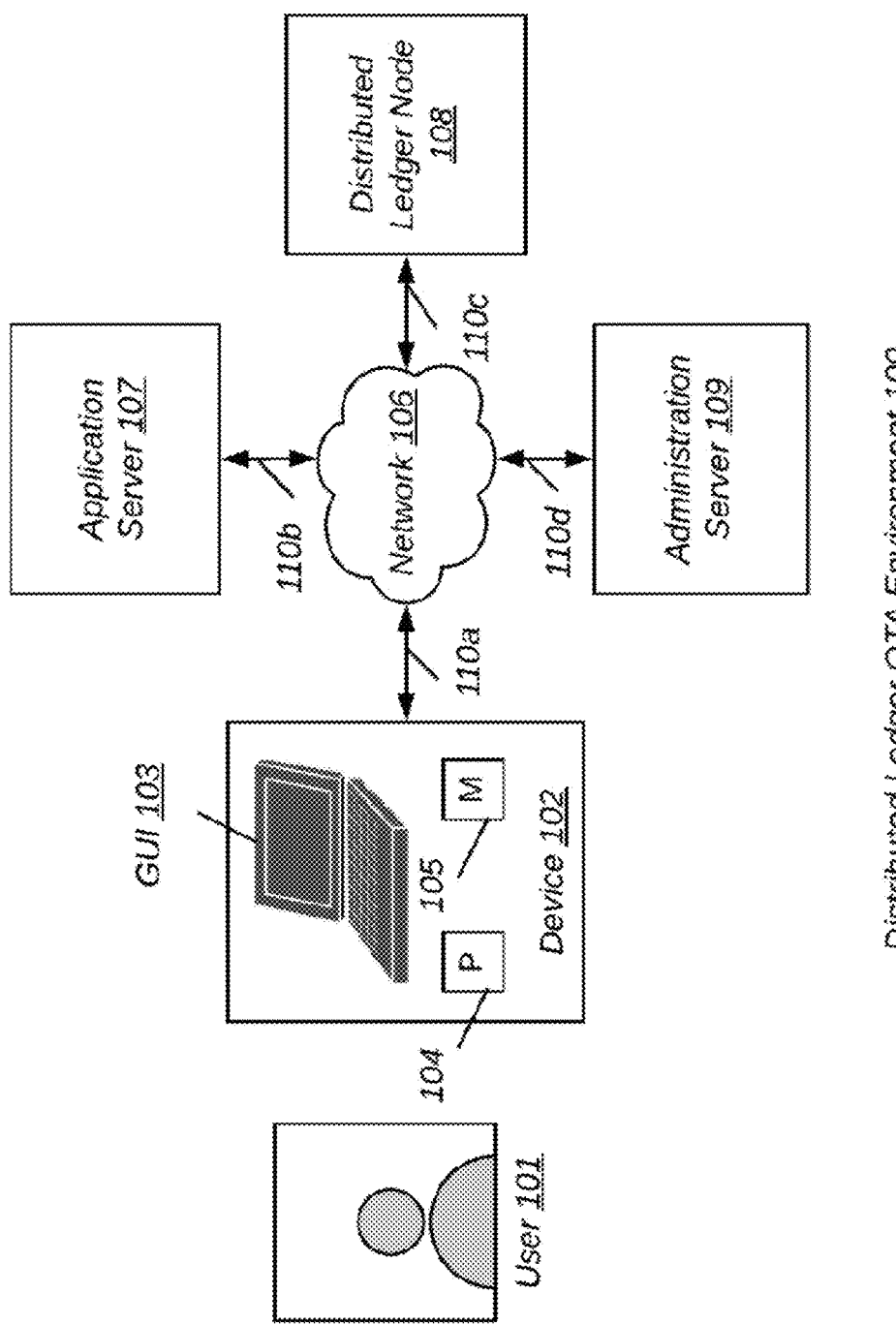
FIG. 1. illustrates an example distributed ledger OTA environment.

The disclosure is particularly applicable to a smart contract over the air update system and method using the protocols and processes described below for a particular blockchain or DLT system and it is in this context that the disclosure will be described. It will be appreciated, however, that the system and method has greater utility since it may be implemented to any DLT or blockchain system (or replace an existing smart contract method for an existing systems) and may be implemented in a different manner than disclosed that is within the scope of the disclosure.

In one embodiment, the over the air smart contract update system and method may be an update mechanism that automatically and quickly deploys new business logic to Smart Contracts running across a network of peers. This mechanism is auditable so that the participants have access to the various versions of the code. Furthermore, the system and method supports updates without downtime, supports rollback, as well as support the execution of multiple concurrent versions of the software.

In at least embodiment of the system and method, the update mechanism is automatic. Thus, the update mechanism can support optional automatic deployments across a multi-party network, without manual intervention. This is a typical pattern used in "autopilot" environments as part of the Continuous Integration/Continuous Deployment (CI/CD) paradigm, where every code change is automatically deployed. This mechanism must be optional, since some changes require manual review for compliance or other Software Development Life Cycle (SDLC) requirements.

The smart contract update system and method may be rapid. The update mechanism can provide a way to deploy an update across a busy multi-party network within seconds. The smart contract update system and method is auditable so that the update history and update payload itself must be auditable and recorded in the ledger (the append-only transaction log). The mechanism is auditable because each Smart Contract software update source code itself is stored within the ledger data structures, which are readily available to all of the network participants. This is a consequence of including the update source code within the transaction (407*a*), so it gains the same auditability characteristics already provided by the blockchain network. Further the update mechanism logic itself is executed within the Smart Contract Runtime 301, which itself is available to all the participants. As such, the update logic itself (which determines whether or not to apply a new update, or how to apply a new update) is updatable using the same update mechanism disclosed.

By including the update mechanism logic itself (FIG. 5.) within the Smart Contract, this allows participants to automatically accept and process a new Smart Contract software update by including these predetermined rules agreed upon by the participants within the Smart Contract. This approach to updates is rapid because it uses the existing transaction processing capability provided by the network to disseminate and then apply the update. The existing transaction dissemination and processing mechanism provided by the network is rapid, in that it processes transactions at low latency. Furthermore, by having the update mechanism itself within the Smart Contract, the participants can automatically accept and install a Smart Contract update, which eliminates manual steps and thus further increases the speed at which the update is applied.

The smart contract update system and method is zero downtime. The update mechanism may support the concurrent execution of multiple versions of the software. This is beneficial to achieve "zero-downtime" deployments, where in-flight requests are processed by the old version concurrently as new requests are processed by the new version. This feature enables uninterrupted processing of requests while the service is updated. The zero-downtime is achieved through the Smart Contract Runtime 301 dynamically looking up and evaluating the business logic for each transaction (processes 510, 512). The transaction itself includes the version ID (406*a*, 406*b*), which is set by the transaction issuer's client. When a new update is triggered, the old clients can still specify earlier versions that are still enabled, thus allowing multiple versions of the Smart Contract to run simultaneously and uninterrupted. Also, the Smart Contract Runtime 301 is not restarted during the over-the-air update, so it continues to service transactions when a new update is installed.

The smart contract update system and method supports rollback so that the system and method can revert to an earlier version of the software. For example, some bugs in new software are only detected after a full or partial rollout of the new version. In these cases, it may be necessary to back out of the deployment and revert to an earlier version of the software that is known to not have the defects.

The smart contract update system and method is flexible. In particular, the update mechanism supports application-specific rules for the update. For example, a banking application that requires the ability for a regulator to make updates to compliance rules, but not payment fee calculation rules. The smart contract update system and method may also be extensible so that, for example, the update mechanism itself be upgradable, using an OTA mechanism. For example, this is necessary to patch security vulnerabilities in the upgrade process itself.

The smart contract update system and method may be fine-grained since blockchain networks consist of multiple smart contracts and ledgers. A single network must support multiple update policies that govern who is allowed to update, when, and what updates are allowed. The smart contract update system and method also provides for the efficient execution of Smart Contract business logic and the OTA mechanism should not interfere with the transaction processing performance requirements necessary for practical Enterprise applications as discussed below with respect to the interpreter 301*a* of the smart contract runtime 301.

Some of the embodiments of the smart contract update system may use one or more Application Program Interfaces (APIs) wherein each API specifies how software components should interact that may include the message formats and protocols that two components use to inter-communicate. Some of the embodiments of the smart contract update system may use an Abstract Syntax Tree (AST) that is a tree data structure of the abstract syntactic structure of source code written in a programming language wherein each node of the tree denotes a construct occurring in the source code. Some of the embodiments of the smart contract update system may a Continuous Integration/Continuous Deployment (CI/CD) pipeline/system that bridges the gaps between development and operation activities and teams by enforcing automation in building, testing and deployment of applications. Modern day developer operations practices involve continuous development, continuous testing, continuous integration, continuous deployment and continuous monitoring of software applications throughout its development life cycle. The CI/CD practice or CI/CD pipeline forms the backbone of modern day developer operations.

Some embodiments of the smart contract update system and method may use Ellipse (ELPS) that is an embedded lisp system for Go (https://golang.org) programs. See github.com/luthersystems/elps for more details.

Some embodiments of the smart contract update system and method may use a Relational Database Management System (RDBMS) that is a database that uses a relational model for retrieving and storing records.

The smart contract update system and method may use a Javascript Object Notation (JSON) format that is a standard file format that is used to transmit and store data objects in a human-readable form and may use JSON remote procedure calls (JSON-RPC) that is a remote procedure call protocol encoded in JSON. JSON-RPC allows for notifications (data sent to the server that does not require a response) and for multiple calls to be sent to the server which may be answered asynchronously. The smart contract update system and method may use JSON Web Token (JWT) that is a standard for creating access tokens that assert verifiable claims. A client includes a JWT as part of its request, which the server subsequently inspects to verify that the client is authorized to make the request.

The smart contract update system and method may use REpresentational State Transfer (REST) that is an architecture style for HTTP APIs that enables interoperation between compliant HTTP clients and servers. The smart contract update system and method may operate using a read your write (RYW) also known as read my writes that is a protocol that requires that if a process performs a write w, then that same process performs a subsequent read r, then r must observe w's effects.

The smart contract update system and method may utilize Source Control Management (SCM) software or Revision Control Systems (RCS) that are each software that stores and manages versions of software source code, with possibly multiple source code contributors. Example SCM include the Git (www.git-scm.com), Subversion (SVN, subversion.apache.org), and Perforce (www.perforce.com) software programs.

The smart contract update system and method may utilize a shim that, in computer programming, is a library that transparently intercepts API calls and changes the arguments passed, handles the operation itself or redirects the operation elsewhere. Shims can be used to support an old API in a newer environment, or a new API in an older environment and for running programs on different software platforms than they were developed for.

The smart contract update system and method may also utilize WebAssembly (abbreviated Wasm) that is an open standard (W3C) for a binary instruction format for a stack-based virtual machine. Wasm is designed as a portable compilation target for programming languages, enabling deployment on the web for client and server applications (www.webassembly.org).

FIG. 1. illustrates an example distributed ledger Over-the-air (OTA) update environment 100. The environment performs distributed ledger functions and supports Smart Contract updates via an OTA mechanism that may be part of the administration server 109 in FIG. 1. As shown in FIG. 1, each user 101 (of one or more users) interacts with a graphical user interface (GUI) 103 using a device 102 that includes at least a processor 104 and memory 105. Each device 102 may further have a user input device, such as a keyboard, keypad or touchscreen for the user to interact with the device 102, a display on which the GUI is displayed and connectivity circuits (wired or wireless) that allow the device 102 to connect to and communicate data using known protocols over a network 106 to other elements of the distributed ledger OTA environment 100. For example, each device 102 may be a smartphone device, a tablet computer, a laptop computer, a terminal and the like. In one exemplary use case, an employee at an insurance company uses a browser application (executed by the processor 104 of the device) on his laptop to access a web portal that displays insurance claims that are processed using distributed ledger technology. The device 102 connects to a network 106 over an interface 110a to access services running on an application server 107, that is connected to the network 106 using an interface 110b. The application server 107 communicates with a distributed ledger node 108 that is connected to the network 106 over an interface 110c. While the environment 100 is architecture as a standard distributed ledger environment, for the OTA aspect, the administration server 109 may communicate with the distributed ledger node 108 automatically (without any manual intervention) in response to an event that occurs on the Application Server 107. For example, when a user 101 merges source code in a source code manager. In addition, the Application Server 107 may automatically start sending messages to an updated Smart Contract without any configuration changes (by a user or automated).

A particular user 101 may use the device 102 associated with the particular user 101 to connect to an Administration Server 109 that is connected to the network 106 over an interface 110d. The Administration Server 109 connects to the Distributed Ledger Node 108 over the Network 106 using the interface 110d to perform administrative and operational functions on the distributed ledger network. Within the environment 100 there are possibly multiple users 101, devices 102, servers 109, application servers 107, and distributed ledger nodes 108, connected over a single network 106. Each of the servers 109, application servers 107, and distributed ledger nodes 108 may be implemented using one or more computing resources, such as processors, memory, server computers, blade servers, etc. wherein the processor(s) of each of these elements executes a plurality of lines of instructions/computer code that cause the processor of that element to be configured to (or causes the processor to) perform the functions and operations of each of these elements as detailed below and in the subsequent figures.

In some embodiments, the one or more users of the system 100 belong to one or more organizations, for example insurance companies, and operate and manage the components in the environment 100 on behalf of their respective organization. In a preferred embodiment, there are multiple environments 100 connected over a single network 106. For example, insurance company A manages a first environment 101A, insurance company B manages a second environment 101B, and the first environment and second environment are interconnected to a common network 106.

In some embodiments, the device 102, application server 107, and administration server 109, are physically located on the premises of an organization and the distributed ledger node 108 is physically located on the premises of a Cloud infrastructure provider. In some embodiments, the device 102, application server 107, administration server 109, and distributed ledger node 108, are physically located on the premises of an organization. In some embodiments, the device 102, application server 107, administration server 109, and distributed ledger node 108, are physically located on the premises of a Cloud infrastructure provider. In some embodiments, the Application Server 107, Distributed Ledger Node 108, and Administration Server 109, are services (pods) running on a kubernetes (//kubernetes.io) cluster. The environment 100 may contain multiple kubernetes clusters interconnected over the network 106, where each cluster is administered by a different organization.

The smart contract update method disclosed in detail below may be used in the environment 100 to perform the OTA smart contract updates that provide the technical solution to the technical problem discussed in the background. Furthermore, the OTA smart contract update process and system may be a technology improvement (in view of the various elements and processes discussed below) to a blockchain technology system since it provides the improvements over the known blockchain systems as discussed above. In one embodiment, the OTA smart contract update process may be performed by the administration server 109 shown in FIG. 1.

Figure 2:
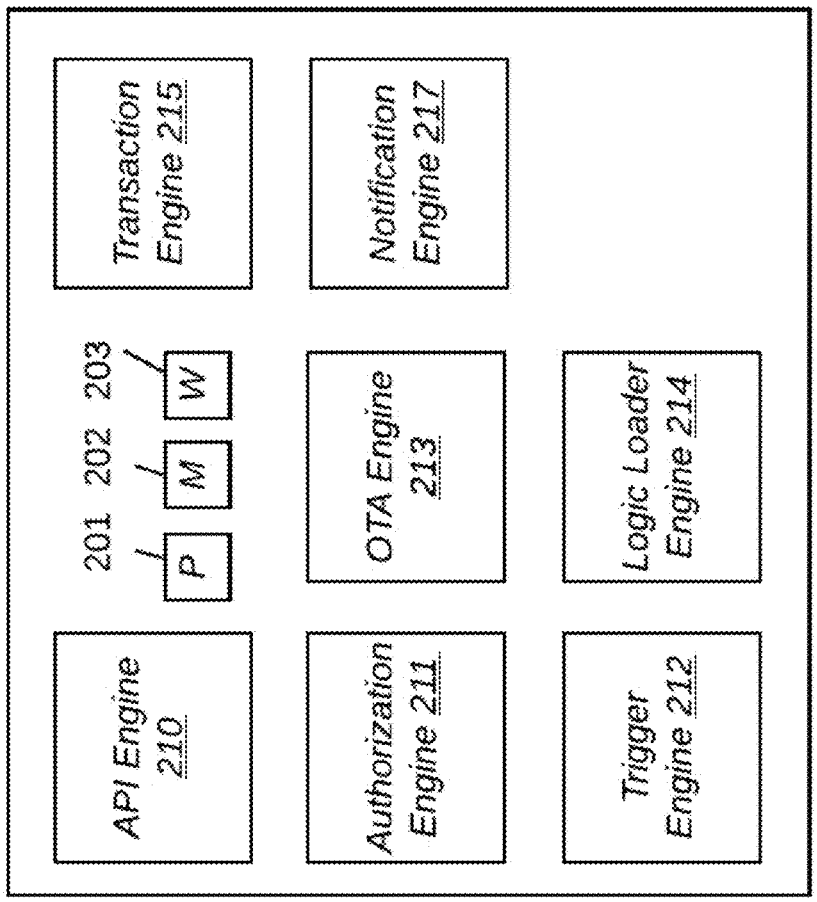
FIG. 2. illustrates an example administration server and its components.

FIG. 2. illustrates the administration server 109 that performs maintenance and operations tasks on behalf of a network administrator users 101NA (not shown). These tasks include the execution of processes to perform an update of a Smart Contract that is running on the Distributed Ledger Node 109. The administration server 109 consists of at least a processor 201, memory 202, and one or more private keys (used for encryption and/or decryption) stored in an electronic wallet 203. The administration server 109 communicates with the distributed ledger node 108, the application server 107, and the device 102, to update one or more smart contracts (that may each be a piece of software with a plurality of lines of instructions/computer code that is executed by a processor of and running on the distributed ledger node 108. In some embodiments, the Administration Server 109 acts as a distributed ledger gateway, in that all distributed ledger requests issued by the Application Server 107 are first sent to the Administration Server 109 which subsequently communicates with Distributed Ledger Nodes 109 on behalf of the Application Server 107. In some embodiments, the Application Server 107 provides a web interface that allows a user 101 (who is authorized/authenticated to have access to the Smart Contract logic) to view and upload Smart Contract business logic directly through the web interface. The user 101 subsequently can approve and initiate an OTA update (using an OTA engine 213) through the click of a single user interface button.

The administration server 109 as shown in FIG. 2 further includes an API engine 210, an authorization engine 211, a trigger engine 212, an OTA engine 213, a logic loader engine 214, a transaction engine 215 and a notification engine 217. Each engine 210-217 may be implemented as a plurality of lines of instructions/computer code that are executed by a processor of the administration server 109 that cause the processor to (or configure to processor to) perform the operations and processes disclosed hereinafter for each engine. The API (Application Programming Interface) Engine 210 receives request messages issued by the device 102 and application server 107. The message requests an update to be deployed to one or more smart contracts (process 601 in the method shown in FIG. 6), for example by triggering the administration server 109 to initiate the OTA smart contract update processes illustrated in FIG. 6. The API engine 210 verifies that the received messages conform to a predetermined message format, and returns an error to the message issuer if this validation fails. If the API engine 210 receives a request for the status of a previously submitted update request, then the API engine 210 will make a request to the distributed ledger node 108 to lookup this status and return the status data to the user. In some embodiments, the API Engine 210 may be implemented using an HTTP server that exposes both a REST/JSON interface and a SOAP/XML interface. In some embodiments, the API Engine 210 may be implemented using an SSH server that receives commands from the commercially available Ansible (www.ansible.com) IT automation tool. In some embodiments, the execution of an update process is triggered by the Trigger Engine 215 in response to the API Engine 210 receiving the update request. In some embodiments, the API Engine 210 includes a CI/CD agent which monitors changes in an external SCM repository and generates smart contract update requests based on the detected changes.

The Authorization Engine 211 receives requests from the API Engine 210 and determines whether or not the request is authorized and can subsequently be processed (process 602 in the method shown in FIG. 6). As part of this determination, the Authorization Engine 211 examines both data about the authenticated issuer of the request, and the type of request. In some embodiments, the Authorization Engine 211 inspects a role included in a JSON Web Token (JWT) generated by the device 102 on behalf of the user 101 to determine whether the user 101 has the necessary permissions to issue the request. In some embodiments, the Authorization Engine 211 communicates with a Distributed Ledger Node 108 via the Transaction Engine 215, as part of making an authorization decision.

Figure 6:
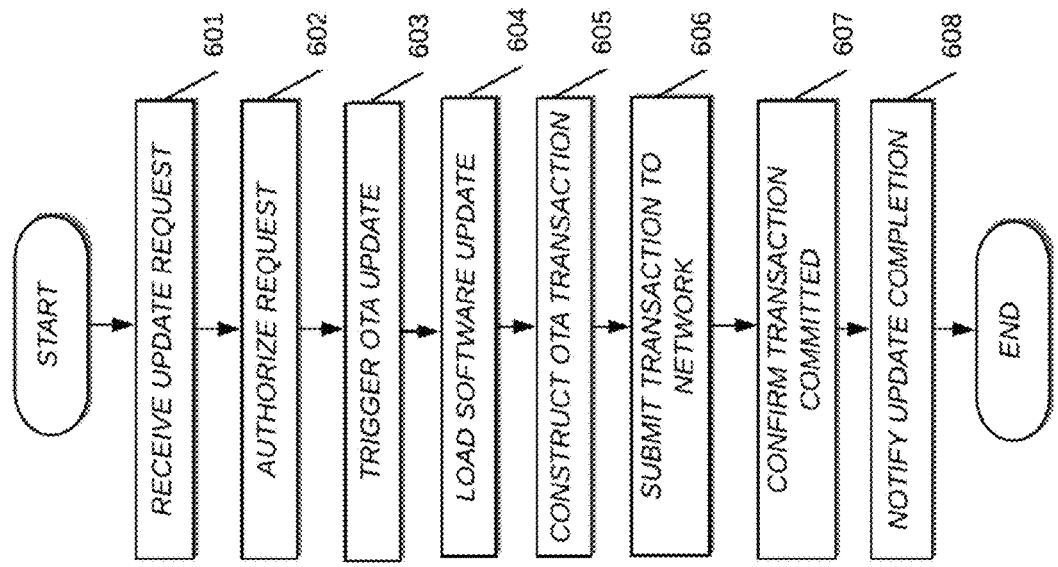
FIG. 6. illustrates an example flow diagram for an OTA process executed by an Administration Server.

The Trigger Engine 212 receives authorized requests from the Authorization Engine 211 and determines whether or not to trigger an OTA update (process 603 in the method shown in FIG. 6). This determination is based on data in the request, for example if the request is an Update Request. In some embodiments, the execution of an update process is automatically triggered by the Trigger Engine 212 upon the merging or updating of source code in Source Control Management (SCM) software. For example, when a Github server automatically sends a request to the API Engine 210 via a registered webhook URL upon the successful merging of code against a master branch managed by the Github server. Alternatively, for example, by the Trigger Engine 212 running CI/CD agent software which actively monitors code changes in an external SCM repository to determine whether to trigger an update.

Figure 3:
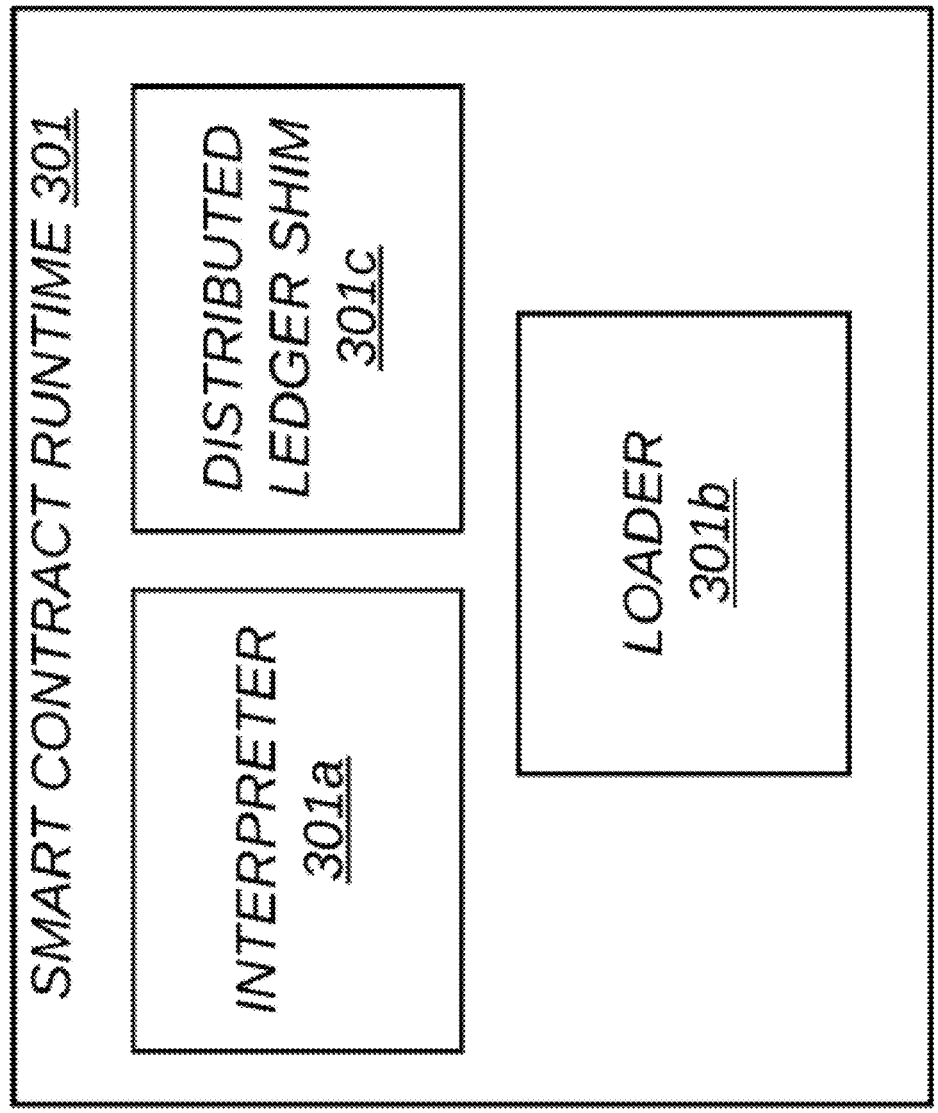
FIG. 3. illustrates an example smart contract runtime that supports OTA functions.
Figure 4:
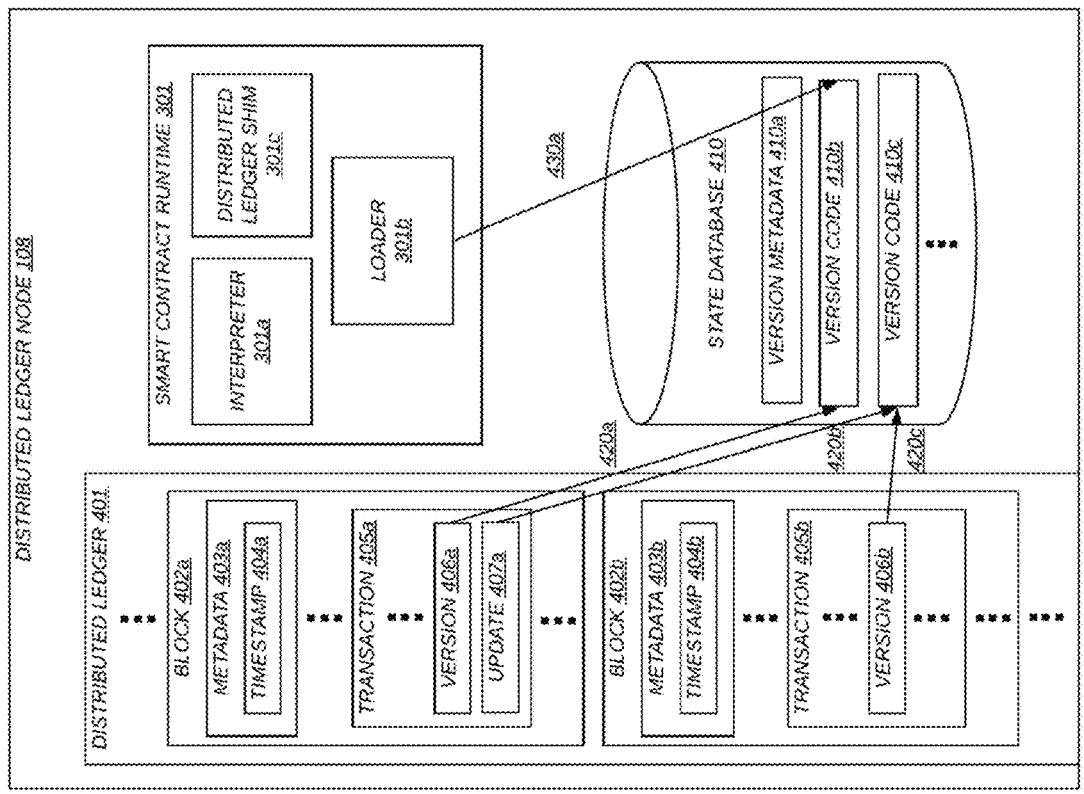
FIG. 4. illustrates an example placement of data in an OTA environment.

The Over-the-air (OTA) Update Engine 213 receives update requests (process 603 in the method shown in FIG. 6) from the Trigger Engine 212 and executes steps in FIG. 6. to initiate an update of software that is executed by the Smart Contract Runtime 301 that is shown in FIGS. 3 and 4. Specifically, the Update Engine 213 makes a request to the Logic Loader Engine 214 to retrieve a software update payload (process 604 in the method shown in FIG. 6). The Update Engine 213 then makes a request to the Transaction Engine 215 to construct a distributed ledger transaction (process 605 in the method shown in FIG. 6) that includes the update payload, which the Transaction Engine 215 then submits (process 606 in the method shown in FIG. 6) to one or more distributed ledger nodes 108 connected to the network 106 for subsequent processing by the Smart Contract Runtime 301. The Smart Contract Runtime 301 subsequently receives the request and executes the steps illustrated in FIG. 5. The Update Engine 213 receives the processing response from the Transaction Engine 215, confirms that the transaction was successfully committed (process 607 in the method shown in FIG. 6), and then makes a request to the Notification Engine 217 that indicates whether the processing succeeded or failed (process 608 in the method shown in FIG. 6). In some embodiments, the Update Engine 213 executes commands on the Administration Server 109 and Distributed Ledger Nodes 108 using the Ansible IT automation tool.

In some embodiments, the Update Engine 213 receives a request to disable a previously installed software version. In this case, the Update Engine 213 extracts a version identifier from the update request and constructs a disable request message that it passes to the Transaction Engine 215 that subsequently submits the disable request to the network 106 for subsequent processing by the Smart Contract Runtime 301. In some embodiments, the Update Engine 213 receives a request to enable a previously disabled software version. In this case, the Update Engine 213 extracts a version identifier from the update request and constructs an enable request message that it passes to the Transaction Engine 215 that subsequently submits the enable request to the network 106 for subsequent processing by the Smart Contract Runtime 301.

In some embodiments, the Update Engine 213 receives a request to list all versions of the software that have been installed on the Smart Contract Runtime 301. This returned list includes the version ID, the status of each version (enabled/disabled), and a timestamp of when the version was installed. The Update Engine 213 constructs a "list" request message that it passes to the Transaction Engine 215 that subsequently submits the request to the network 106 for subsequent processing by the Smart Contract Runtime 301.

In some embodiments, the Update Engine 213 receives a request to retrieve the source code of a previously installed software version. The Update Engine 213 constructs a "details" request message that it passes to the Transaction Engine 215 that subsequently submits the request to the network 106 for subsequent processing by the Smart Contract Runtime 301. In some embodiments, the Update Engine 213 receives a request to lookup the version ID of the source code that was used when processing a specified transaction referenced by transaction ID. The Update Engine 213 constructs a "lookup" request message that it passes to the Transaction Engine 215 that subsequently submits the request to the network 106 for subsequent processing by the Smart Contract Runtime 301.

The Logic Loader Engine 214 receives an update request from the OTA Engine 213 and constructs a software update payload message (process 604 in the method shown in FIG. 6) that it returns to the OTA Engine 213. In some embodiments, the Loader Engine 214 extracts the update payload directly from a field in the update request. In some embodiments, the Loader Engine 214 extracts a version identifier from the update request. The Loader Engine 214 then uses the version identifier to download the update payload from an external storage system, for example stored on the Amazon S3 blob storage system. In this case, the payload may have been generated as an output artifact of an automated CI/CD system. In some embodiments, the Loader Engine 214 extracts a version identifier from the update request. The Loader Engine 214 then uses the version identifier to download source code from an external SCM system, for example stored on Github. The Loader Engine 214 then processes or builds the downloaded source code to construct an update payload. In some embodiments, the update payload consists of source code for an interpreted programming language, for example the Ellipse programming language. In some embodiments, the update payload is binary, byte code or assembly, for example in the WebAssembly (WASM) standard, or a subset of the WASM standard such as eWASM.

The Transaction Engine 215 constructs distributed ledger transactions 405a, 405b shown in FIG. 4, submits them to one or more distributed ledger nodes 108, and processes the results of the network executing this transaction. Specifically, it receives an update payload from the OTA engine 214 that was previously loaded (process 604 in the method shown in FIG. 6) by the Logic Loader Engine 214. The transaction engine 215 uses a distributed ledger client to construct (process 605 in the method shown in FIG. 6) a distributed ledger transaction 405a,405b that includes the software version identifier 406a within the transaction 405a, 405b payload shown in FIG. 4. The Smart Contract Runtime 301 uses this version 406a to determine what source code 410b to use when processing the transaction. The blocks are listed in FIG. 4. sequentially, where block 402a is committed before block 402b. The transaction engine 215 also includes the updated software code 407a in an OTA update. The transaction engine 215 uses the wallet 203 to sign distributed ledger transactions. The transaction engine then submits the transaction (process 606 in the method shown in FIG. 6) to one or more distributed ledger nodes 108 that run a Smart Contract 301 that receives this transaction 501 and executes the workflow illustrated in FIG. 5. to apply the software update and store the update information on the ledger 410a, 410b, 410c. The transaction is validated and confirmed by the network of distributed ledger nodes 108 and is placed in a block 402a, 402b on the distributed ledger 401. The block 402a contains metadata 403a, 403b associated with the transactions, along with a timestamp 404a which denotes when the block 402a was created. Note that the update versions 406a, 406b on the distributed ledger 401 refer to 420a, 420b software code records 410a, 410c stored in the state database 410. The transaction engine 215 receives a corresponding response generated by the Smart Contract 509 which includes a deployment status that confirms (process 607 in the method shown in FIG. 6) whether the network determined that the update was successfully processed and installed. FIG. 4. illustrates the records and their relations to each other, after the above steps are complete. This approach includes the update payload for the Smart Contract 301 within the distributed ledger transaction payload 407a. In other words, the update distribution uses or "piggybacks" on the transaction dissemination mechanism provided by the distributed ledger services to propagate the Smart Contract update. This approach makes the Smart Contract update endogenous to the network, as opposed to relying upon an external or "out-of-band" mechanism for code distribution. From a Smart Contract viewpoint, the update itself is made available to the Smart Contract Runtime 301 through the version code 410c in the state database 410. This method of making the Smart Contract aware of the updates and update mechanism itself is known as "reification" in the programming language domain (en.wikipedia.org/wiki/Reification_(computer_science)#:~:text=Reification%20is%20the%20process). In some embodiments, the transaction engine 215 uses a permissioned blockchain, for example Hyperledger fabric, to construct transactions 405a, 405b and submit them to a distributed ledger node 108.

Figure 5:
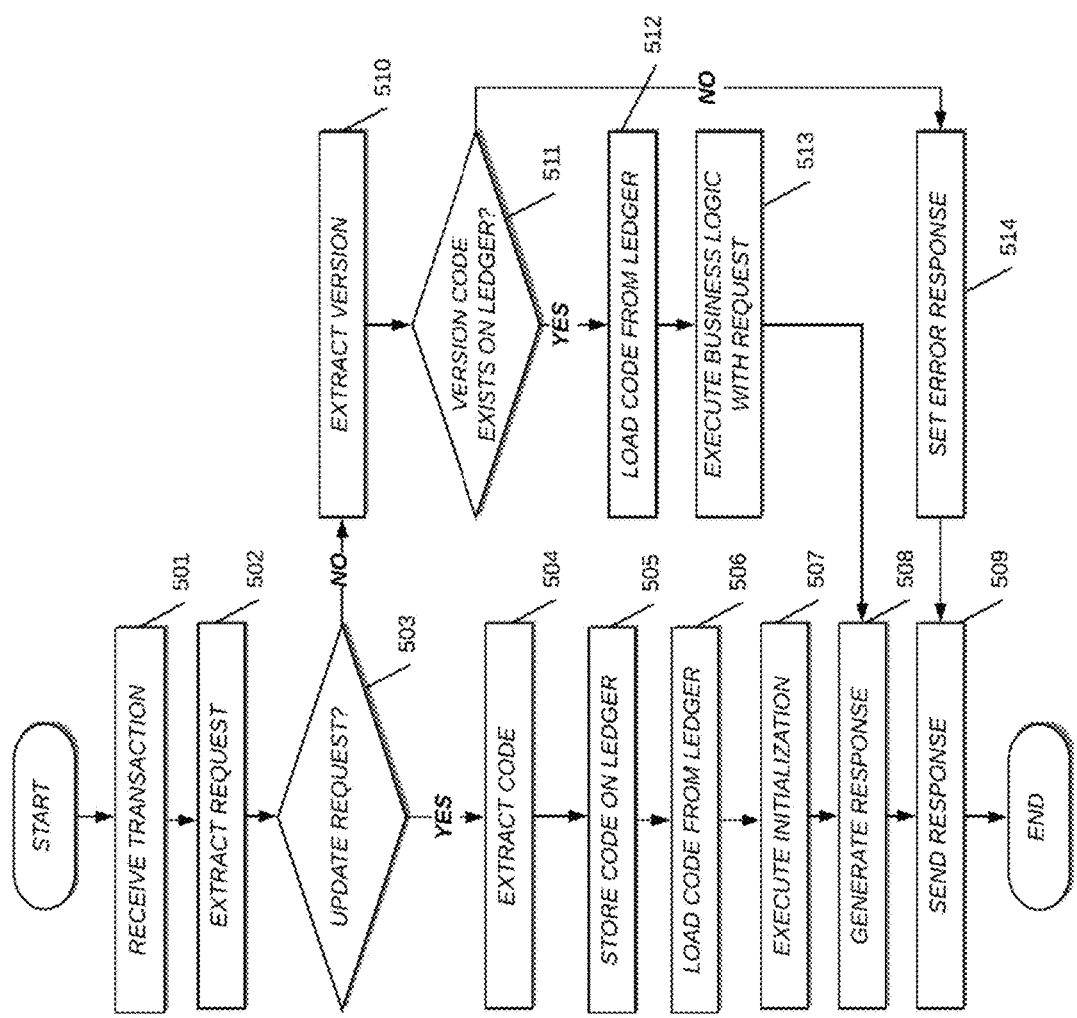
FIG. 5. illustrates an example flow diagram for transaction processing logic.

In some embodiments, the steps illustrated in FIG. 5. is a process that is executed by a Smart Contract Runtime 310 in FIG. 3. to perform an over-the-air update. In some embodiments, the transaction engine 215 includes a software version within every transaction 406a, 406b, which references version metadata 410a and version code 410b, 410c stored in the state database 410. Specifically, the Smart Contract Runtime 301 that receives and processes the transaction 405a, 405b uses the version 406a, 406b included in the transaction to load 512 and execute the corresponding version code 410b, 410c stored in the state database 410 to process the transaction 513. In some embodiments, the transaction engine 215 includes a special software version with identifier "latest" which indicates to the Smart Contract Runtime 301 to load the latest version code 410b, 410c that is enabled in the State Database 410.

The Notification Engine 217 receives requests from the OTA Engine 213 that include the update status 509, or confirmation that the update succeeded. In some embodiments, the Notification Engine 217 sends a request to an SCM system to notify the system that the deployment succeeded or failed. In some embodiments, the Notification Engine 217 sends a request to a chat system, for example Slack, that notifies a channel of team members whether the deployment succeeded or failed. In some embodiments, the Notification Engine 217 sends a request to an email server to notify team members whether the deployment succeeded or failed.

FIG. 3. illustrates the Smart Contract Runtime 301, or runtime, that runs as a Smart Contract on the distributed ledger network 106 and at a node 108. The runtime 301 includes several components that facilitate the execution of the process illustrated in FIG. 5. This process includes both the ability to execute business logic to process a request (process 513 in FIG. 5), as well as the ability to update the business logic (process 505 in FIG. 5). This Smart Contract Runtime 301 reads and writes data to the state database 410 in response to processing transactions. In some embodiments, the Smart Contract Runtime 301 is implemented in Hyperledger Fabric chaincode written in the Go programming language. In some embodiments, the Smart Contract Runtime 301 runs on the same server as the Distributed Ledger Node 108. In some embodiments, the Smart Contract Runtime 301 runs external to the Distributed Ledger Node 108, on a separate server. For example, using the Hyperledger Fabric external chaincode capability.

The smart contract runtime 301 may include an interpreter 301*a*, a loader 301*b* and a distributed ledger shim 301*c*. The Interpreter 301*a* receives Smart Contract business logic code from the loader 301*b* as well as a request for processing from the Distributed Ledger Shim 301*c*. The interpreter 301*a* executes the business logic code by first parsing the business logic code and then evaluating the parsed code by passing the request as an argument to a predetermined entrypoint function defined in the business logic (process 513 in FIG. 5). As part of the evaluation, the interpreter 301*a* makes calls to read and write data from the state DB via the distributed ledger shim 301*c*. The result of this execution is a response message generated by the business logic code (process 508 in FIG. 5). In some embodiments, the request message is in JSON-RPC format and the interpreter 301*a* includes a standard library that routes the request to user-defined methods in the business logic code that match the method specified in the JSON-RPC message. FIG. 7. illustrates two such methods: 1) init, and 2) healthcheck. In some embodiments, the interpreter 301*a* is an Ellipse interpreter that includes a standard library with built-in functions that interact with the distributed ledger node 108, such as reading and writing to the state database 410. In some embodiments, the interpreter 301*a* is a bytecode interpreter, or virtual machine, that evaluates business logic byte code. For example, the Ethereum Virtual Machine (EVM), WebAssembly (WASM), or Ethereum Web Assembly (eWASM). In some embodiments, the interpreter 301*a* includes an in-memory cache that stores the Abstract Syntax Tree (AST) of previously parsed source code. This in-memory cache avoids parsing for already parsed sections of source code, to speed up performance of the overall business logic execution.

The Loader 301*b* receives a transaction from the Distributed Ledger Shim 301*c*, extracts a request (process 502 in FIG. 5) from the transaction, and determines whether or not the request is an over-the-air update request (process 503 in FIG. 5). If the request is not an update, then the loader 301*b* extracts the version from the request (process 510 in FIG. 5) and communicates with the shim 301*c* to determine 430*a* if the corresponding code 410*b* for the version is available in the state database 410. If the code 410*b*, 410*c* is available, then the loader 301*b* uses the shim 301*c* to load the code from the state database (process 512 in FIG. 5). The loader 301*b* then calls the interpreter 301*a* with the loaded code and with the extracted request (process 502 in FIG. 5), which the interpreter subsequently executes 513 and generates a response (process 508 in FIG. 5). The loader 301*b* then returns this response to the Distributed Ledger Shim 301*c*. If there is no matching version, then the loader 301*b* generates an error response (process 514 in FIG. 5). If the matching version 430*a* is marked as disabled in the version metadata 410*a*, then the loader 301*b* generates an error response. If the request is an update request 503 then the loader 301*b* extracts the code from the request (process 504 in FIG. 5), makes a request to the shim 301*c* to store the code (process 505 in FIG. 5) in the state database 410, which creates a version code record, for example 410*b*, 410*c*. The loader 301*b* also makes a request to the shim 301*c* to mark the version as enabled in the version metadata 410*a* record. The loader 301*b* subsequently loads (process 506 in FIG. 5) the code 410*b*, 410*c* from the state database 410 and passes the code to the interpreter 301*a* with the instruction to call a pre-determined initialization function defined in the business logic, for example illustrated by the "init" endpoint in FIG. 7. The interpreter 301*a* executes the initialization function (process 507 in FIG. 5) and generates a response (process 508 in FIG. 5). The loader then returns this response to the shim 301*c*. In some embodiments, the extracted request (process 502 in FIG. 5) is a JSON-RPC request, and the generated response (process 508 in FIG. 5) is a JSON-RPC response. In some embodiments, the loader 301*b* includes a "dirty bit" field which is a boolean flag that indicates whether the transaction should be subsequently committed to the ledger after the business logic is evaluated. If an error is raised as part of the execution of the business logic (process 513 in FIG. 5), or if there is no matching source code on the ledger for a requested version (process 514 in FIG. 5), then the loader 301*b* sets the dirty bit to false. Otherwise, as part of the business logic execution (process 513 in FIG. 5) if there is data stored on the ledger then the dirty bit is set to true. As part of process 606 in FIG. 6, when the Transaction Engine 215 receives a response that has a dirty bit set to false then it will not subsequently submit the transaction to the network for commitment. In some embodiments, the loader 301*b* uses the shim 301*c* to include transaction events based on the execution of the business logic, for example in FIG. 7. These events are stored in the common ledger data structures and are available to blockchain clients with access to the channel.

The Distributed Ledger Shim 301*c*, or shim, provides a programmatic interface to communicate with distributed ledger services. The runtime 301 uses the shim to register an entrypoint function that is called whenever the runtime 301 receives a transaction for processing, from a distributed ledger node 108. When the shim receives a transaction, it extracts the request from the transaction and passes the request to the loader 301*a* for subsequent execution. The shim 301*c* maintains a unique context for each transaction, which it uses to store transaction metadata, including a request ID. As part of the execution by the loader 301*b*, the loader calls functions on the shim 301*c* to perform distributed ledger smart contract functions, for example to read and write data to the state database. In some embodiments, the shim 301*c* uses the fabric-chaincode-go library to interface with a Hyperledger Fabric distributed ledger. In some embodiments, the shim 301*c* includes an in-memory state database write cache that stores the values of all state database writes during the execution of the transaction. The shim 301*c* directs all reads to use this cache, allowing the business logic, for example illustrated in FIG. 7. to read the values of earlier writes within the transaction. In the database domain, this is known as Read-Your-Writes (RYW) semantics.

FIG. 7. illustrates an example payload update. It is an example minimal placeholder Smart Contract update written in the Ellipse programming language. It defines a Smart Contract with 2 main endpoints, which are functions that receive messages via transactions: 1) initialization "init", and 2) a health check. In this simple example, init returns an empty response, and the health check simply logs a warning message and returns an error. The initialization function is called by the runtime 301 when the code is first deployed (process 507 in FIG. 5).

The foregoing description, for purpose of explanation, has been with reference to specific embodiments. However, the illustrative discussions above are not intended to be exhaustive or to limit the disclosure to the precise forms disclosed. Many modifications and variations are possible in view of the above teachings. The embodiments were chosen and described in order to best explain the principles of the disclosure and its practical applications, to thereby enable others skilled in the art to best utilize the disclosure and various embodiments with various modifications as are suited to the particular use contemplated.

The system and method disclosed herein may be implemented via one or more components, systems, servers, appliances, other subcomponents, or distributed between such elements. When implemented as a system, such systems may include and/or involve, inter alia, components such as software modules, general-purpose CPU, RAM, etc. found in general-purpose computers. In implementations where the innovations reside on a server, such a server may include or involve components such as CPU, RAM, etc., such as those found in general-purpose computers.

Additionally, the system and method herein may be achieved via implementations with disparate or entirely different software, hardware and/or firmware components, beyond that set forth above. With regard to such other components (e.g., software, processing components, etc.) and/or computer-readable media associated with or embodying the present inventions, for example, aspects of the innovations herein may be implemented consistent with numerous general purpose or special purpose computing systems or configurations. Various exemplary computing systems, environments, and/or configurations that may be suitable for use with the innovations herein may include, but are not limited to: software or other components within or embodied on personal computers, servers or server computing devices such as routing/connectivity components, handheld or laptop devices, multiprocessor systems, microprocessor-based systems, set top boxes, consumer electronic devices, network PCs, other existing computer platforms, distributed computing environments that include one or more of the above systems or devices, etc.

In some instances, aspects of the system and method may be achieved via or performed by logic and/or logic instructions including program modules, executed in association with such components or circuitry, for example. In general, program modules may include routines, programs, objects, components, data structures, etc. that perform particular tasks or implement particular instructions herein. The inventions may also be practiced in the context of distributed software, computer, or circuit settings where circuitry is connected via communication buses, circuitry or links. In distributed settings, control/instructions may occur from both local and remote computer storage media including memory storage devices.

The software, circuitry and components herein may also include and/or utilize one or more type of computer readable media. Computer readable media can be any available media that is resident on, associable with, or can be accessed by such circuits and/or computing components. By way of example, and not limitation, computer readable media may comprise computer storage media and communication media. Computer storage media includes volatile and non-volatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical storage, magnetic tape, magnetic disk storage or other magnetic storage devices, or any other medium which can be used to store the desired information and can accessed by computing component. Communication media may comprise computer readable instructions, data structures, program modules and/or other components. Further, communication media may include wired media such as a wired network or direct-wired connection, however no media of any such type herein includes transitory media. Combinations of the any of the above are also included within the scope of computer readable media.

In the present description, the terms component, module, device, etc. may refer to any type of logical or functional software elements, circuits, blocks and/or processes that may be implemented in a variety of ways. For example, the functions of various circuits and/or blocks can be combined with one another into any other number of modules. Each module may even be implemented as a software program stored on a tangible memory (e.g., random access memory, read only memory, CD-ROM memory, hard disk drive, etc.) to be read by a central processing unit to implement the functions of the innovations herein. Or, the modules can comprise programming instructions transmitted to a general-purpose computer or to processing/graphics hardware via a transmission carrier wave. Also, the modules can be implemented as hardware logic circuitry implementing the functions encompassed by the innovations herein. Finally, the modules can be implemented using special purpose instructions (SIMD instructions), field programmable logic arrays or any mix thereof which provides the desired level performance and cost.

As disclosed herein, features consistent with the disclosure may be implemented via computer-hardware, software, and/or firmware. For example, the systems and methods disclosed herein may be embodied in various forms including, for example, a data processor, such as a computer that also includes a database, digital electronic circuitry, firmware, software, or in combinations of them. Further, while some of the disclosed implementations describe specific hardware components, systems and methods consistent with the innovations herein may be implemented with any combination of hardware, software and/or firmware. Moreover, the above-noted features and other aspects and principles of the innovations herein may be implemented in various environments. Such environments and related applications may be specially constructed for performing the various routines, processes and/or operations according to the invention or they may include a general-purpose computer or computing platform selectively activated or reconfigured by code to provide the necessary functionality. The processes disclosed herein are not inherently related to any particular computer, network, architecture, environment, or other apparatus, and may be implemented by a suitable combination of hardware, software, and/or firmware. For example, various general-purpose machines may be used with programs written in accordance with teachings of the invention, or it may be more convenient to construct a specialized apparatus or system to perform the required methods and techniques.

Aspects of the method and system described herein, such as the logic, may also be implemented as functionality programmed into any of a variety of circuitry, including programmable logic devices ("PLDs"), such as field programmable gate arrays ("FPGAs"), programmable array logic ("PAL") devices, electrically programmable logic and memory devices and standard cell-based devices, as well as application specific integrated circuits. Some other possibilities for implementing aspects include: memory devices, microcontrollers with memory (such as EEPROM), embedded microprocessors, firmware, software, etc. Furthermore, aspects may be embodied in microprocessors having software-based circuit emulation, discrete logic (sequential and combinatorial), custom devices, fuzzy (neural) logic, quantum devices, and hybrids of any of the above device types. The underlying device technologies may be provided in a variety of component types, e.g., metal-oxide semiconductor field-effect transistor ("MOSFET") technologies like complementary metal-oxide semiconductor ("CMOS"), bipolar technologies like emitter-coupled logic ("ECL"), polymer technologies (e.g., silicon-conjugated polymer and metal-conjugated polymer-metal structures), mixed analog and digital, and so on.

It should also be noted that the various logic and/or functions disclosed herein may be enabled using any number of combinations of hardware, firmware, and/or as data and/or instructions embodied in various machine-readable or computer-readable media, in terms of their behavioral, register transfer, logic component, and/or other characteristics. Computer-readable media in which such formatted data and/or instructions may be embodied include, but are not limited to, non-volatile storage media in various forms (e.g., optical, magnetic or semiconductor storage media) though again does not include transitory media. Unless the context clearly requires otherwise, throughout the description, the words "comprise," "comprising," and the like are to be construed in an inclusive sense as opposed to an exclusive or exhaustive sense; that is to say, in a sense of "including, but not limited to." Words using the singular or plural number also include the plural or singular number respectively. Additionally, the words "herein," "hereunder," "above," "below," and words of similar import refer to this application as a whole and not to any particular portions of this application. When the word "or" is used in reference to a list of two or more items, that word covers all of the following interpretations of the word: any of the items in the list, all of the items in the list and any combination of the items in the list.

Although certain presently preferred implementations of the invention have been specifically described herein, it will be apparent to those skilled in the art to which the invention pertains that variations and modifications of the various implementations shown and described herein may be made without departing from the spirit and scope of the invention. Accordingly, it is intended that the invention be limited only to the extent required by the applicable rules of law.

While the foregoing has been with reference to a particular embodiment of the disclosure, it will be appreciated by those skilled in the art that changes in this embodiment may be made without departing from the principles and spirit of the disclosure, the scope of which is defined by the appended claims.

What is claimed is:

1. A method, comprising:
   providing a distributed ledger system having a plurality of ledger nodes wherein each ledger node has a smart contract executable by each ledger node, a state database, a smart contract runtime and a distributed ledger;
   storing, in the state database, a first version code for a first update to the smart contract;
   receiving, at an administration server of the distributed ledger system, an update request for the smart contract;
   triggering, by a trigger engine of the administration server of the distributed ledger system, an update of the smart contract;
   storing, in the state database, a second version code of the smart contract in response to the update request;
   constructing, by an update engine of the administration server of the distributed ledger system, an update smart contract distributed ledger transaction having a version identifier for the updated smart contract, wherein the version identifier refers to a version code stored in the state database;
   submitting, by a transaction engine of the administration server of the distributed ledger system, the update smart contract distributed ledger transaction to each ledger node; and
   wherein the smart contract runtime in a particular ledger node of the plurality of ledger nodes is configured to use the version identifier in the update smart contract distributed ledger transaction to determine a version code for the updated smart contract to process a particular transaction and to execute the particular transaction in the particular ledger node using the determined version code of the updated smart contract.

2. The method of claim 1 further comprising receiving, at a smart contract runtime in each ledger node, the update smart contract distributed ledger transaction and further comprising updating, by the smart contract runtime in each ledger node, the smart contract in each ledger node.

3. The method of claim 1, wherein receiving the update request further comprises receiving an automatic update request so that the smart contract in each ledger node is automatically updated.

4. The method of claim 3, wherein receiving the automatic update request further comprising generating, by the trigger engine of the administration server of the distributed ledger system, the automatic update request in response to a source code management change.

5. The method of claim 3, wherein receiving the automatic update request further comprising generating, by the trigger engine of the administration server of the distributed ledger system, the automatic update request in response to monitoring a source code management code change.

6. The method of claim 1, wherein receiving the update request further comprises performing a manual review of the smart contract update before the smart contract update is performed.

7. The method of claim 1, wherein the distributed ledger system is a blockchain network having a plurality of blockchain distributed ledger nodes.

8. The method of claim 1, wherein submitting the update smart contract distributed ledger transaction to each ledger node further comprises including a source code of the smart contract update in the update smart contract distributed ledger transaction and further comprising auditing, by each ledger node, the update smart contract distributed ledger transaction using the source code of the smart contract update.

9. The method of claim 2 further comprising updating update logic of the smart contract runtime by constructing, by the update engine of the administration server of the distributed ledger system, an update smart contract runtime logic transaction and submitting, by the transaction engine of the administration server of the distributed ledger system, the update smart contract runtime logic transaction to each ledger node.

10. The method of claim 1, wherein the smart contact includes an update mechanism logic for performing the updating process.

11. The method of claim 1, wherein the smart contract further comprises a plurality of versions of the smart contract that each execute on the distributed ledger system so that the smart contract is updated to a new version while an old version of the smart contract continues to execute on the distributed ledger system.

12. The method of claim 11 further comprising rolling back to a prior version of the smart contract after the smart contract update is completed.

13. A system, comprising:
a distributed ledger system having a plurality of ledger nodes wherein each ledger node has a smart contract executable by each ledger node, a state database, a smart contract runtime and a distributed ledger, each ledger node being a computer system having a processor that executes the smart contract;
the state database stores a first version code for a first update to the smart contract;
an administration server of the distributed ledger system being a computer system with a processor that receives an update request for the smart contract;
a trigger engine being a plurality of lines of instructions executed by the processor of the administration server that causes the processor to trigger an update of the smart contract;
the state database stores a second version code of the smart contract in response to the update request;
an update engine being a plurality of lines of instructions executed by the processor of the administration server that causes the processor to construct an update smart contract distributed ledger transaction having a version identifier for the updated smart contract, wherein the version identifier refers to a version code stored in the state database;
a transaction engine being a plurality of lines of instructions executed by the processor of the administration server that causes the processor to submit the update smart contract distributed ledger transaction to each ledger node; and
wherein the smart contract runtime is configured to determine, using the version identifier in the update smart contract distributed ledger transaction in a particular ledger node of the plurality of ledger nodes, a version code for the updated smart contract to process a particular transaction and to execute the particular transaction in the particular ledger node using the determined version code of the updated smart contract.

14. The system of claim 13 further comprising a smart contract runtime at each ledger node that receives the update smart contract distributed ledger transaction and updates the smart contract based on the update smart contract distributed ledger transaction for the ledger node.

15. The system of claim 13, wherein the processor of the administration server is further caused to receive an automatic update request so that the smart contract in each ledger node is automatically updated.

16. The system of claim 15, wherein the trigger engine causes the processor to generate the automatic update request in response to a source code management change.

17. The system of claim 15, wherein the trigger engine causes the processor to generate the automatic update request in response to monitoring a source code management code change.

18. The system of claim 13, wherein the distributed ledger system is a blockchain network having a plurality of blockchain distributed ledger nodes.

19. The system of claim 13, wherein the update smart contract distributed ledger transaction further comprises a source code of the smart contract update and wherein each ledger node is capable of auditing the update smart contract distributed ledger transaction using the source code of the smart contract update.

20. The system of claim 14, wherein the update engine further causes the processor to construct an update smart contract runtime logic transaction and wherein the transaction engine further causes the processor to submit the update smart contract runtime logic transaction to each ledger node to update the smart contract runtime logic of the smart contract.

21. The system of claim 13, wherein the smart contract further comprises a plurality of versions of the smart contract that each execute on the distributed ledger system so that the smart contract is updated to a new version while an old version of the smart contract continues to execute on the distributed ledger system.

22. The system of claim 21, wherein each ledger node is capable of rolling back to a prior version of the smart contract after the smart contract update is completed.

23. The method of claim 1, wherein the version identifier in the particular transaction is a latest identifier and wherein determining the version code of the updated smart contract further comprises selecting a latest version of the version code of the updated smart contract from the first and second version codes of the updated smart contract.

24. The system of claim 13, wherein the version identifier in the particular transaction is a latest identifier and wherein the smart contract runtime selects a latest version of the version code of the updated smart contract from the first and second version codes of the updated smart contract.

* * * * *